US008559115B2

(12) United States Patent
Szilagyi et al.

(10) Patent No.: US 8,559,115 B2
(45) Date of Patent: *Oct. 15, 2013

(54) FLUIDIC STABILIZED FOCUS DEVICE

(75) Inventors: Andrei Szilagyi, Danville, CA (US); Robert G. Batchko, Albuquerque, NM (US)

(73) Assignee: Holochip Corporation, Albuquerque, NM (US)

(*) Notice: Subject to any disclaimer, the term of this patent is extended or adjusted under 35 U.S.C. 154(b) by 971 days.

This patent is subject to a terminal disclaimer.

(21) Appl. No.: 12/620,502

(22) Filed: Nov. 17, 2009

(65) Prior Publication Data

US 2010/0128357 A1 May 27, 2010

Related U.S. Application Data

(60) Provisional application No. 61/115,456, filed on Nov. 17, 2008.

(51) Int. Cl.
*G02B 3/14* (2006.01)
*G02B 3/12* (2006.01)

(52) U.S. Cl.
USPC .......................................... 359/666; 359/665

(58) Field of Classification Search
USPC ................................................. 359/665–667
See application file for complete search history.

(56) References Cited

U.S. PATENT DOCUMENTS

| 696,788 | A | 4/1902 | Allen |
|---|---|---|---|
| 2,300,251 | A | 10/1942 | Flint |
| 2,504,039 | A | 4/1950 | O'Leary |
| 4,261,655 | A | 4/1981 | Honigsbaum |
| 4,444,471 | A | 4/1984 | Ford, Jr. et al. |
| 4,466,706 | A * | 8/1984 | Lamothe, II ................. 359/666 |
| 4,514,048 | A | 4/1985 | Rogers |
| 4,783,155 | A | 11/1988 | Imataki et al. |
| 4,784,479 | A | 11/1988 | Ikemori |
| 4,890,903 | A | 1/1990 | Treisman et al. |
| 5,672,001 | A | 9/1997 | Bertling et al. |
| 5,774,273 | A | 6/1998 | Bornhorst |
| 5,973,852 | A | 10/1999 | Task |

(Continued)

FOREIGN PATENT DOCUMENTS

| JP | 10144975 | 5/1998 |
|---|---|---|
| JP | 11133210 | 5/1999 |
| JP | 2000081504 | 3/2000 |
| WO | 9918456 | 4/1999 |

OTHER PUBLICATIONS

J. Chen et al., "Variable-Focusing Microlens with Microfluidic Chip", J. Micromech.Microeng. 14, p. 675-680, 2004.

(Continued)

*Primary Examiner* — Scott J Sugarman
(74) *Attorney, Agent, or Firm* — Joshua D. Isenberg; JDI Patent

(57) ABSTRACT

A fluidic stabilized focus device comprises a fluidic lens core and a first yoke. The fluidic lens core includes a support ring, a first surface that includes an elastic membrane, a second surface, and a volume of fluid enclosed within the boundaries of the first and second surfaces and support ring. The first yoke has an annular portion configured to engage the first surface. Engagement of the first surface by the first yoke results in a displacement of the fluid and a change in optical properties of the device.

22 Claims, 3 Drawing Sheets

(56) References Cited

U.S. PATENT DOCUMENTS

| | | |
|---|---|---|
| 6,288,767 B1 | 9/2001 | Murata et al. |
| 6,369,954 B1 | 4/2002 | Berge et al. |
| 6,542,309 B2 | 4/2003 | Guy |
| 6,618,208 B1 | 9/2003 | Silver |
| 6,860,601 B2 | 3/2005 | Shadduck |
| 7,068,439 B2 | 6/2006 | Esch et al. |
| 7,072,086 B2 | 7/2006 | Batchko |
| 7,142,369 B2 | 11/2006 | Wu et al. |
| 7,218,429 B2 | 5/2007 | Batchko |
| 7,218,430 B2 | 5/2007 | Batchko |
| 7,359,124 B1 | 4/2008 | Fang et al. |
| 7,369,321 B1 | 5/2008 | Ren et al. |
| 7,369,723 B1 | 5/2008 | Mescher |
| 7,374,301 B1 | 5/2008 | Simmers |
| 7,440,193 B2 | 10/2008 | Gunasekaran et al. |
| 7,453,646 B2 | 11/2008 | Lo |
| 7,697,214 B2 * | 4/2010 | Batchko et al. ............... 359/665 |
| 7,755,840 B2 | 7/2010 | Batchko et al. |
| 7,948,683 B2 | 5/2011 | Batchko |
| 2004/0240076 A1 | 12/2004 | Silver |
| 2004/0262645 A1 | 12/2004 | Huff et al. |
| 2006/0077562 A1 | 4/2006 | Silver |
| 2006/0126190 A1 | 6/2006 | Berge et al. |
| 2006/0164731 A1 | 7/2006 | Wu et al. |
| 2007/0030573 A1 | 2/2007 | Batchko et al. |
| 2007/0211207 A1 | 9/2007 | Lo et al. |
| 2007/0263293 A1 | 11/2007 | Batchko et al. |
| 2008/0285143 A1 | 11/2008 | Batchko et al. |
| 2009/0021823 A1 | 1/2009 | Heim et al. |
| 2009/0040361 A1 | 2/2009 | Heim et al. |
| 2010/0232031 A1 | 9/2010 | Batchko |
| 2011/0007161 A1 | 1/2011 | Batchko |
| 2011/0267703 A1 | 11/2011 | Batchko |

OTHER PUBLICATIONS

S. Perichon et al. "Stretchable Gold Conductors on Elastomeric Substrate", Applied. Physics. Letter, vol. 82, No. 15, p. 2404-2406, Apr. 14, 2003.

Hongwen Ren et al. "Variable-Focus Liquid Lens by Changing Aperature", Applied Physics Letters, vol. 86, No. 21107, May 17, 2005, p. 211107-3.

* cited by examiner

FLUIDIC STABILIZED FOCUS DEVICE

CLAIM OF PRIORITY

This application claims the benefit of priority of U.S. Provisional Patent Application 61/115,456 filed Nov. 17, 2008, the entire contents of which are incorporated herein by reference.

CROSS-REFERENCE TO RELATED APPLICATIONS

This application is related commonly-assigned, co-pending application Ser. No. 12/620,503, to Andrei Szilagyi et al., entitled "FLUIDIC VIEWFINDER DEVICE", filed the same day, as the present application, the entire disclosures of which are incorporated herein by reference.

This application is related to commonly-assigned U.S. Provisional Patent Application No. 60/987,493 filed Nov. 13, 2007, the entire disclosures of which are incorporated herein by reference in its entirety.

This application is related to commonly-assigned US Provisional Patent Application No. 60/987,498, to Robert G. Batchko et al., entitled "VIEW FINDER WITH FLUIDIC LENS", filed Nov. 13, 2007, the entire disclosures of which are incorporated herein by reference in its entirety.

This application is related to commonly-assigned U.S. Provisional Patent Application No. 61/115,459, to Robert G. Batchko et al., entitled "VIEW FINDER WITH FLUIDIC LENS", filed Nov. 17, 2008, the entire disclosures of which are incorporated herein by reference in its entirety.

This application is related to commonly-assigned U.S. Provisional Patent Application No. 61/171,044, to Robert G. Batchko et al., entitled "VARIABLE-FOCAL-LENGTH FLUIDIC LENS WITH REDUCED OPTICAL ABERRATION", filed Apr. 20, 2009, the entire disclosures of which are incorporated herein by reference in its entirety.

This application is related to commonly-assigned U.S. patent application Ser. No. 11/383,216, to Robert G. Batchko et al., entitled "FLUIDIC OPTICAL DEVICES", filed May 14, 2006, the entire disclosures of which are incorporated herein by reference in its entirety.

This application is related to commonly-assigned U.S. patent application Ser. No. 11/928,076, to Robert G. Batchko et al., entitled "FLUIDIC OPTICAL DEVICES", filed Oct. 30, 2007, the entire disclosures of which are incorporated herein by reference in its entirety.

This application is related to commonly-assigned U.S. patent application Ser. No. 11/928,216, to Robert G. Batchko et al., entitled "FLUIDIC OPTICAL DEVICES", filed Oct. 30, 2007, the entire disclosures of which are incorporated herein by reference in its entirety.

This application is related to commonly-assigned U.S. patent application Ser. No. 11/928,376, to Robert G. Batchko et al., entitled "FLUIDIC OPTICAL DEVICES", filed Oct. 30, 2007, the entire disclosures of which are incorporated herein by reference in its entirety.

This application is related to commonly-assigned U.S. patent application Ser. No. 11/747,845, to Robert G. Batchko et al., entitled "FLUIDIC LENS WITH ELECTROSTATIC ACTUATION", filed May 11, 2007, the entire disclosures of which are incorporated herein by reference in its entirety.

This application is related to commonly-assigned U.S. patent application Ser. No. 12/117,625, to Robert G. Batchko et al., entitled "FLUIDIC LENS WITH MANUALLY-ADJUSTABLE FOCUS", filed May 8, 2008, the entire disclosures of which are incorporated herein by reference in its entirety.

FIELD OF THE INVENTION

This invention relates generally to optics. More particularly, it relates to fluidic stabilized optical devices.

BACKGROUND

Actuated fluidic lens structures are described in commonly owned U.S. provisional patent applications 60/680,832, 60/683,072, 60/703,837, 60/723,281, 60/747,181 and 60/916,739, which are incorporated herein by reference. Fluidic lens structures are also described in U.S. patent application Ser. No. 11/747,845 and U.S. Patent Application publication 20070030573 which are incorporated herein by reference. Other examples of fluidic lens structures are described in U.S. Pat. Nos. 7,072,086, 7,218,429 and 7,218,430, the disclosures of which are all incorporated herein by reference.

It is within this context that embodiments of the present invention arise.

DETAILED DESCRIPTION

In the present application, additional inventive teachings are provided to expand the applicability of fluidic lenses.

Embodiments of the present invention can be based on a fluid-filled chamber capable of squeezing transparent (or at least partially transparent or transmissive) fluid into a centrally-disposed elastic-membrane-delimited lens. Pressurization of the fluid causes the membranes to bulge, thereby controllably altering the optical power of the lens. The elastic energy of the membranes can provide a portion of the restoring force. The restoring force can prevail once the actuating force is diminished thereby returning the lens to a 'natural' or unaltered state. This approach to adjusting optical power also applies to the embodiments of the invention described below. However, it may also be desirable for a portion of the restoring force to be provided by other components such as a pump to move fluid in and out of the chamber, or another elastic portion of the lens such as the side wall of the fluidic lens core.

Figure 1:
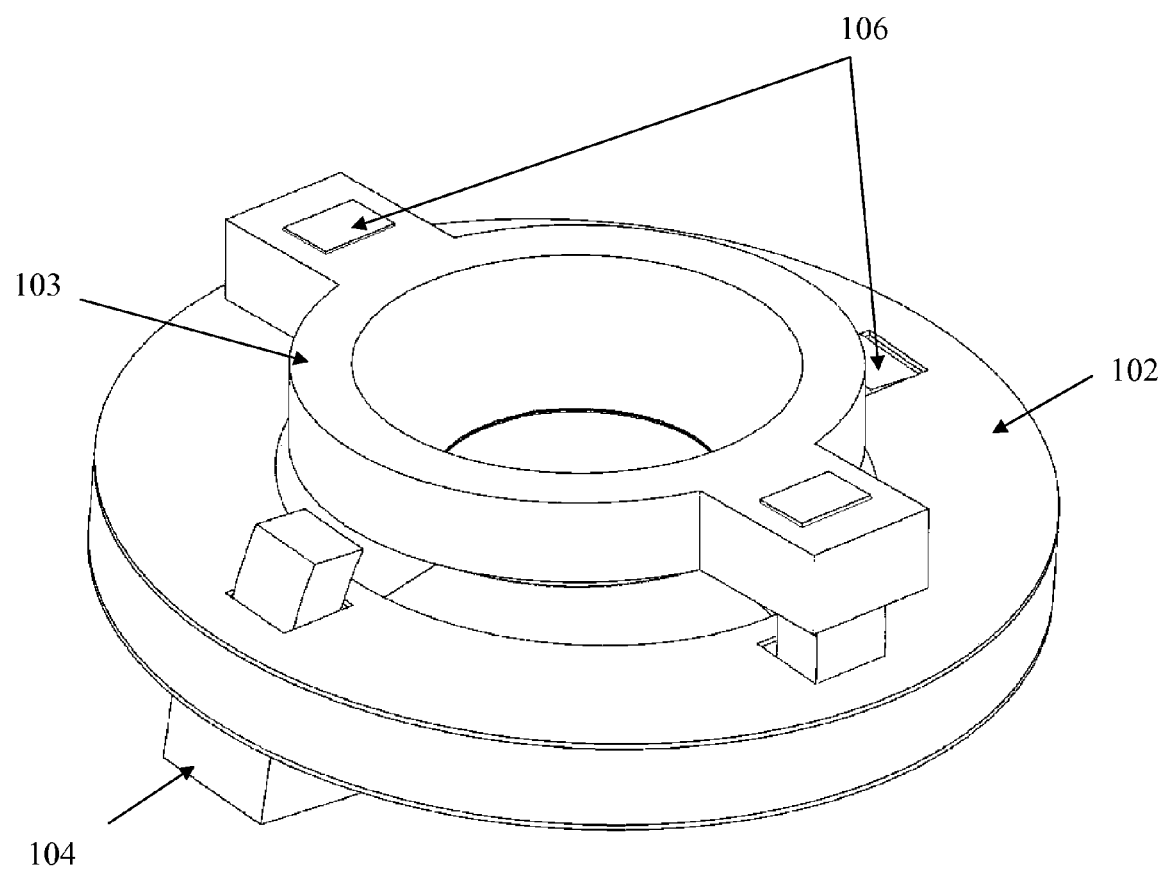
FIG. 1 is a three dimensional view of Stabilized Focus Device according to an embodiment of the present invention.
Figure 2:
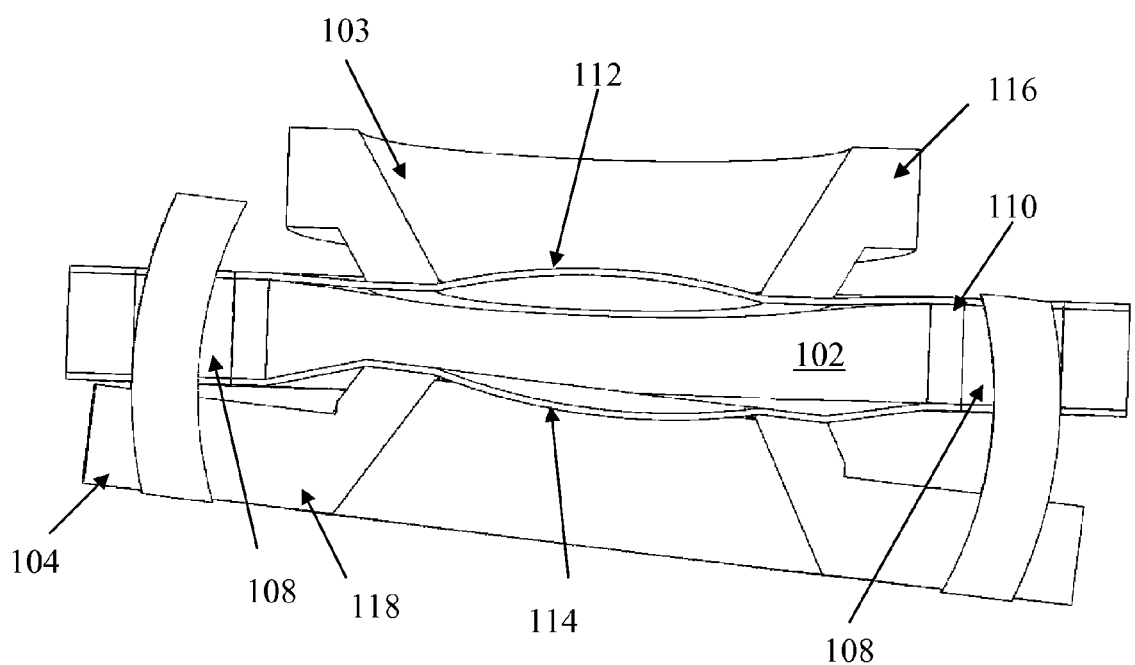
FIG. 2 is a cross sectional view of Stabilized Focus Device described in FIG. 1.

A fluidic stabilized focus device (SFD) 100 according to an embodiment of the present invention is depicted in FIG. 1. The device 100 includes a fluidic lens core 102 (sometimes referred to as a fluidic lens or LiquidPill or liquid pill). Examples of fluidic lens cores are described, e.g., in U.S. patent application Ser. No. 11/747,845 and U.S. Patent Application publication 20070030573, which have been incorporated herein by reference. The fluidic lens core 102 can be simply a volume of liquid confined in a cylindrical space with a side wall (or support ring or support member) 110 and elastic membranes 112, 114 (or alternatively, one elastic membrane and one fixed optical element), respectively forming its top and bottom boundaries. Focusing (or change in focus or focal power) can be achieved by pressing one or more ring shaped pistons 116, 118 against the membranes 112, 114, thus causing the interior portion of the pressed membrane to bulge, as described in the above-mentioned applications. If, in addition to axial motion (e.g., along an axis of symmetry of the ring 110), the rings are allowed to tilt, the resulting fluidic lens may likewise be tilted, as shown in FIG. 2. This may cause the image space to be tilted or adjusted in a lateral direction (or "shifted").

The ring pistons of the device are each equipped with side arms adapted to receive a torque, thereby creating the desired tilt angle. The ring structure with two side arms is referred to herein as a yoke 103 or 104. Each membrane is provided with a dedicated yoke, with their tilting axes arranged orthogonally with respect to each other. In FIG. 2, by way of example, the bottom yoke 104 is seen tilting the axis of the bottom membrane 114 lens dome while the top yoke 103 is not shown causing such tilt of the top membrane. Some possible reasons why the top membrane 112 tilt may not be apparent in FIG. 2 include the following: (a) the top yoke 103 may not be tilted relative to the unstressed (or unactuated) membrane 112, or (b) the top yoke 103 may have its tilting axis is in the plane of FIG. 2.

Not shown in FIG. 2 is the suspension of the yokes 103, 104, however, a number of possibilities are available. Firstly, with suitable actuator bias providing continuous compression of the rings 116, 118 against the membranes 112, 114, and with the permanent magnets nestled within the cores of solenoids disposed within or in proximity to the fluidic lens core 102, the yokes 103, 104 may be made dynamically stable. For static stability, an adhesive bond may be formed between rings and membranes. Alternatively, slender, resilient fibers or ribbons may join diametrically opposed points on the ring with anchor points on the surrounding support structure.

Actuation of the yoke may occur, e.g., through magnetic forces developed between the solenoids 108 and permanent magnets 106. There are many design variations compatible with embodiments of the present invention. For instance, air-core electromagnets—sometimes called voice coil motors—may be mounted on—and move with the yokes. For rapid image stabilization response, such an arrangement may be advantageous in view of the reduced mass of the voice coils compared to that of permanent magnets 106. Electrical connections made with relatively thin flexible wires might not be able to carry very large peak currents, thus limiting the available torque. However, a moving permanent magnet would not have such current limitation, although its frequency response may be limited by a relatively larger moment of inertia contribution.

In devising an electronic driver for the device, it is useful to note that a substantially pure rotation (for example, a tilt of the device without a change of focal power) may be obtained with substantially opposite forces being produced by different actuators disposed on the same yoke. Thus, it may be convenient for a given such pair of actuators to be driven differentially. Commercial amplifiers are available with differential outputs that may be suitable for this purpose. To vary the focusing power contribution from a yoke, the attached actuator pair may be driven with a common mode signal. Such a signal may be injected through a bias terminal on differential amplifiers. Alternatively, a mechanical bias or actuation may be used if the required focusing action is has a suitably slow response time (or speed). For instance, permanent magnets may be mounted at telescopically adjustable positions aligned with the actuators to create such a bias.

In the above-described example of the device, the directional adjustment may be supplied through two mutually orthogonal yokes. This arrangement may be particularly convenient, for example, when the angular range is relatively large and the required speed is not very great. A different embodiment may be more appropriate for a smaller angular range with a higher bandwidth (or speed). In such a case, a single yoke may carry the two pairs of armatures. In addition to the higher bandwidth, another reason such a structure may need relatively low tilt amplitudes is to avoid the occurrence of twisting torques that may occur as a result of certain cyclic sequences of tilt commands. Similar twisting is known in mathematics as occurring from the non-commutative nature of rotation operations. For small tilt angles, the resultant twist may be successfully overcome by methods including the yoke suspension, as discussed above. In the case of two yokes, the orthogonal axes may be fully decoupled such that no such twisting occurs.

The case of the preceding embodiment (i.e., in which two pairs of armatures are attached to a single yoke, also referred to as a "four-armed yoke") may be subdivided into several variants. In a first variant, the yoke may engage one membrane (or "optical surface" or "surface") in order to perform both tilt and focus. This may allow the other surface of the lens to be designed as a fixed (or "static" or "rigid") optical component (or optical element), such as a glass or plastic lens, optical plate, window, mirror, filter, polarizer, etc. as also described in the co-pending patent applications referred to above. A second variant may reduce the burden of focusing on the four-armed yoke by performing additional focusing of the other membrane with a purely axially translating second yoke (or piston ring) as also further described in co-pending applications. This may lead to reduced peak strain in each of the two actuated membranes. A third variant may completely remove the focusing function from the four-armed yoke by interposing an optical element (such as a static optical element, an optical flat or window or a glass or plastic lens) between the tilting ring and the membrane on one side of the device. At least a portion of this optical element may be substantially rigid. Such a configuration may be advantageous in cases where it is important to minimize off-axis aberrations. Another benefit of the second and third variants is that the driving circuit may only need to produce differential signals (i.e. no common mode component to the driving signal may be needed). Consequently, the control software may be composed of independent modules for focusing and tilting. The tilting function may have applications in areas including image stabilization, target tracking, scanning and wide field-of-view imaging as known in the art and further described below.

Figure 3:
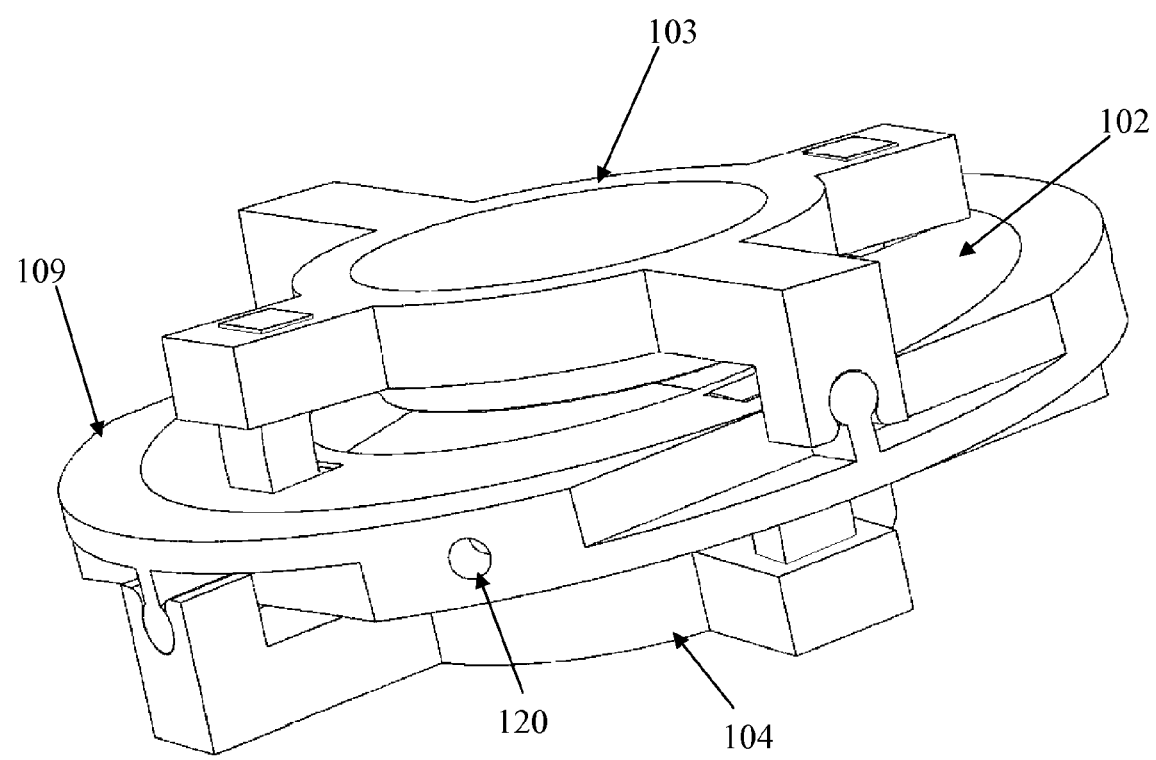
FIG. 3 is a perspective view of a Stabilized Focus Device with the tilt functions decoupled from the other as well as from the focusing function.

FIG. 3 illustrates an example of a fluidic stabilized focusing device in which each of the tilt functions may be fully decoupled from the other as well as from the focusing function. Unlike the previously described yokes 103, 104, those of the embodiment depicted in FIG. 3 may be prevented from piston-like movements by a hinge pivoting around an axis coplanar with the unstressed optical surface (or membrane). A hinge ring 109 may provide pivoting axes to one or more of a top yoke 103 or bottom yoke 104. The hinge ring 109 may also include a channel 120 providing fluid communication between the interior space of the fluidic lens core 102 and a source of controlled-pressure lens fluid (not shown). Alternatively, channel 120 may include a reservoir compartment in fluid communication with an enclosed volume of fluid (or "main fluid compartment") of the device. Such a reservoir compartment may be formed by a distinct compartment in fluid communication with the main fluid compartment the device. In this fashion, movement of fluid from the reservoir compartment to the main fluid compartment, or vice versa, may cause a change in curvature of the elastic membrane. Alternatively, the main fluid compartment and reservoir compartment may be separated by a compliant wall (not shown) wherein both compartments may be filled with an incompressible fluid (or gel or polymer). In this fashion, changes in pressure, or fluid displacement, may be communicated between the two compartments by deformation of the compliant wall.

The change in curvature may result in a change in the focusing properties of the device. Since the liquid pressure may control the focusing power of the device, this embodiment may allow the function of the yokes to be exclusively that of tilt about their respective hinge axes.

The embodiments disclosed above may be conveniently coupled to control methods developed for specific functions. Such methods may employ control signals produced by either separate sensor devices or electronic processors operating on the image itself. The focusing function, for instance, might employ the output of a laser ranging device, or an ultrasonic ranging device, or an optically triangulating device, etc. Alternatively, an image produced by the device may be analyzed by an image processor to reveal the spatial frequency content in the image. A feedback loop may call for the focusing means described above to vary the focal length until the image reaches a sharpest condition, as indicated by maximized spatial frequency content. In this fashion, the device may function as part of an autofocus and/or zoom lens system for applications in devices such as cameras or binoculars.

Additionally, the device may function as part of an image stabilization system for applications in devices such as cameras or binoculars. For image stabilization, the control system might employ signals from an accelerometer, or a gyroscope, to compensate for unintentional movements of the camera body by redirecting the field of view of the lens. Alternatively, the image might be electronically processed to reveal translation of the sharply focused features. The direction and magnitude of such translations may serve as correction signals for closed loop control of image position. It may be necessary for the processing speed to be fast enough to keep the image in nearly focused condition. This could mean that for highly dynamic scenes, the camera system may need to employ not only a fast, and perhaps dedicated, processor but also a focal plane array sensor with a high frame rate. This could be particularly applicable for military applications where rapidly moving objects must be tracked in real time.

Optically, tilting the lens membrane may cause a sideways deflection of the internal rays. As a result, it is possible that some vignetting may occur. For small angles of tilt, such vignetting may be negligible. To mitigate vignetting at larger tilt angles, it may be necessary to tilt the yokes about an axis located deeper in the device. In this fashion, the tilt may be accompanied by a slight lateral displacement (or shift) of the ring of the yoke, which may be utilized to compensate for the lateral movement (or shift) of the image or rays. Careful balancing of membrane stresses may be critical for such configurations.

Numerous other variations of these embodiments are possible without departing from their essential inventive content. For instance, other well known mechanical actuators (such as piezoelectric actuators, piezoelectric ring benders, electroactive polymer, or motors) may be employed to actuate the yoke(s) or piston ring(s) or create the tilt or focusing action. Further, other methods, algorithms or traditional techniques for achieving autofocus, zoom or image stabilization, as known in the art, may be applied to the device. Further, one or more of the optical surfaces (or membranes) may be at least partially transmissive, reflective (such as a mirror), diffractive, refractive, include gratings, holographic optical elements, optical coatings (such as antireflective coatings, highly reflective coatings, nanoscale coatings or anti-fog coatings). Still further, two or more fluidic stabilized focus devices may be disposed in a system along one or more optical axes. Alternatively a system may utilize a fluidic stabilized focus device and other adaptive (or active) optical elements such as fluidic lenses, deformable mirrors, MEMS mirrors, liquid crystal lenses, liquid crystal prisms, electro-optic lenses, electro-optic prisms, switchable holographic optical elements or other active optical elements as known in the art. Such systems utilizing multiple active devices may include zoom lenses that also provide autofocus or image stabilization functions.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for." Any feature described herein, whether preferred or not, may be combined with any other feature, whether preferred or not.

What is claimed is:

1. A fluidic stabilized focus device; comprising
   a fluidic lens core comprising a support ring;
   a first surface which includes an elastic membrane;
   a second surface;
   and a volume of fluid enclosed within the boundaries of the first and second surfaces and support ring; and
   a first yoke having an annular portion configured to engage the first surface;
   wherein engagement of the first surface by the first yoke results in a displacement of the fluid and a change in optical properties of the device;
   wherein an axis of symmetry of the first yoke is configured to tilt relative to an axis of symmetry of the support ring.

2. The device of claim 1 wherein the first yoke is configured to pivot or translate about one or more axes.

3. The device of claim 1 wherein the change in optical properties of the device include one or more of a change in focal power, tilt or shift of an image space of the fluidic lens core.

4. The device of claim 1 wherein one or more of the first surface or second surface is transparent, reflective, or diffractive.

5. The device of claim 1 wherein one or more of the surfaces includes coatings.

6. The device of claim 1 further comprising a first actuator for actuating the first yoke and causing the first yoke to engage the first surface.

7. The device of claim 6 wherein the first actuator includes one or more of a permanent magnet, electromagnet, solenoid, piezoelectric actuator, piezoelectric ring bender, electroactive polymer, or motor.

8. The device of claim 1 wherein at least a portion of the second surface includes an elastic membrane.

9. The device of claim 1 further comprising a hinge ring in communication with the support ring;
   wherein the hinge ring includes one or more hinges disposed in communication with one or more yokes;

wherein each hinge is configured to permit its respective yoke to pivot about an axis of rotation.

10. The device of claim 1 wherein the second surface is a static optical component.

11. The device of claim 1 wherein the device is part of an autofocus system.

12. The device of claim 1 wherein the device is part of an image stabilization system.

13. The device of claim 1 wherein the device is part of a zoom system.

14. The device of claim 1 wherein the fluid is at least partially transparent.

15. A fluidic stabilized focus device; comprising
a fluidic lens core comprising a support ring;
a first surface which includes an elastic membrane;
a second surface;
and a volume of fluid enclosed within the boundaries of the first and second surfaces and support ring; and
a first yoke having an annular portion configured to engage the first surface;
wherein engagement of the first surface by the first yoke results in a displacement of the fluid and a change in optical properties of the device;
further comprising a second yoke having an annular portion;
wherein the second yoke is configured to engage the second surface.

16. The device of claim 15 wherein the second yoke is configured to pivot or translate about one or more axes.

17. The device of claim 15 further comprising a second actuator for actuating the second yoke and causing the second yoke to engage the second surface.

18. The device of claim 17 wherein the second actuator includes one or more of a permanent magnet, electromagnet, solenoid, piezoelectric actuator, piezoelectric ring bender, electroactive polymer, or motor.

19. The device of claim 15 wherein the first yoke and second yoke are configured to tilt about mutually orthogonal axes.

20. A fluidic stabilized focus device; comprising
a fluidic lens core comprising a support ring;
a first surface which includes an elastic membrane;
a second surface;
and a volume of fluid enclosed within the boundaries of the first and second surfaces and support ring; and
a first yoke having an annular portion configured to engage the first surface;
wherein engagement of the first surface by the first yoke results in a displacement of the fluid and a change in optical properties of the device;
further comprising a piston ring adapted to translate along an axis;
wherein the piston ring is configured to engage one or more of the first surface or second surface;
wherein engagement of one or more of the first surface or second surface by the piston ring results in displacing at least a portion of the fluid and deformation of one or more of the first surface or second surface;
wherein deformation of one or more of the first surface or second surface results in a change in a focal power of the device.

21. The device of claim 20 further comprising a piston ring actuator for causing the piston ring engage one or more of the first surface or second surface.

22. The device of claim 21 wherein the piston ring actuator includes one or more of a permanent magnet, electromagnet, solenoid, piezoelectric actuator, piezoelectric ring bender, electroactive polymer, or motor.

\* \* \* \* \*